United States Patent [19]
Roger

[11] 3,828,628
[45] Aug. 13, 1974

[54] METHODS OF EXTRUDING HELICAL GEAR BLANKS

[75] Inventor: Yves Roger, Billancourt, France

[73] Assignees: Regie Nationale Des Usines Renault, Billancourt; Automobiles Peugeot, Paris, both of, France

[22] Filed: July 12, 1973

[21] Appl. No.: 378,501

Related U.S. Application Data

[62] Division of Ser. No. 199,987, Nov. 18, 1971.

[30] Foreign Application Priority Data
Nov. 24, 1970 France .............................. 70.42073
Nov. 3, 1971 France .............................. 71.39420

[52] U.S. Cl. ............................................. 76/107 R
[51] Int. Cl. ............................................. B21k 5/20
[58] Field of Search ........... 76/107 R, 107 A, 107 S, 76/107 B, 107 C

[56] References Cited
UNITED STATES PATENTS

| | | |
|---|---|---|
| 2,364,005 | 11/1944 | Simons .............................. 76/107 A |
| 2,385,198 | 9/1945 | Engle .............................. 76/107 A |
| 2,598,975 | 6/1952 | Coulter .............................. 76/107 R |
| 2,635,487 | 4/1953 | Potter et al. .............................. 76/107 A |
| 3,048,060 | 8/1962 | Rudness .............................. 76/107 R |
| 3,293,950 | 12/1966 | Kern et al. .............................. 76/107 R |

Primary Examiner—Harrison L. Hinson
Attorney, Agent, or Firm—Stevens, Davis, Miller & Mosher

[57] ABSTRACT

Method of manufacturing helical gear blanks by cold extrusion, characterized in that it comprises the steps of passing successive billets through a die formed with internal helical teeth in order to impress these internal helical teeth by extrusion in the billet for forming external helical teeth in the cylindrical surface of said billets, said billets being driven through said die by a punch adapted to rotate freely.

4 Claims, 4 Drawing Figures

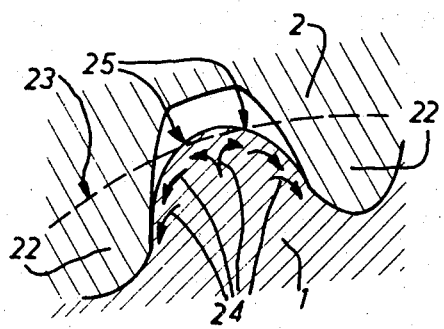
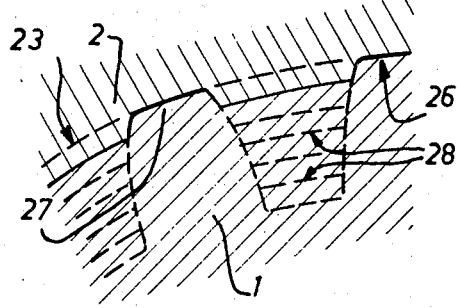
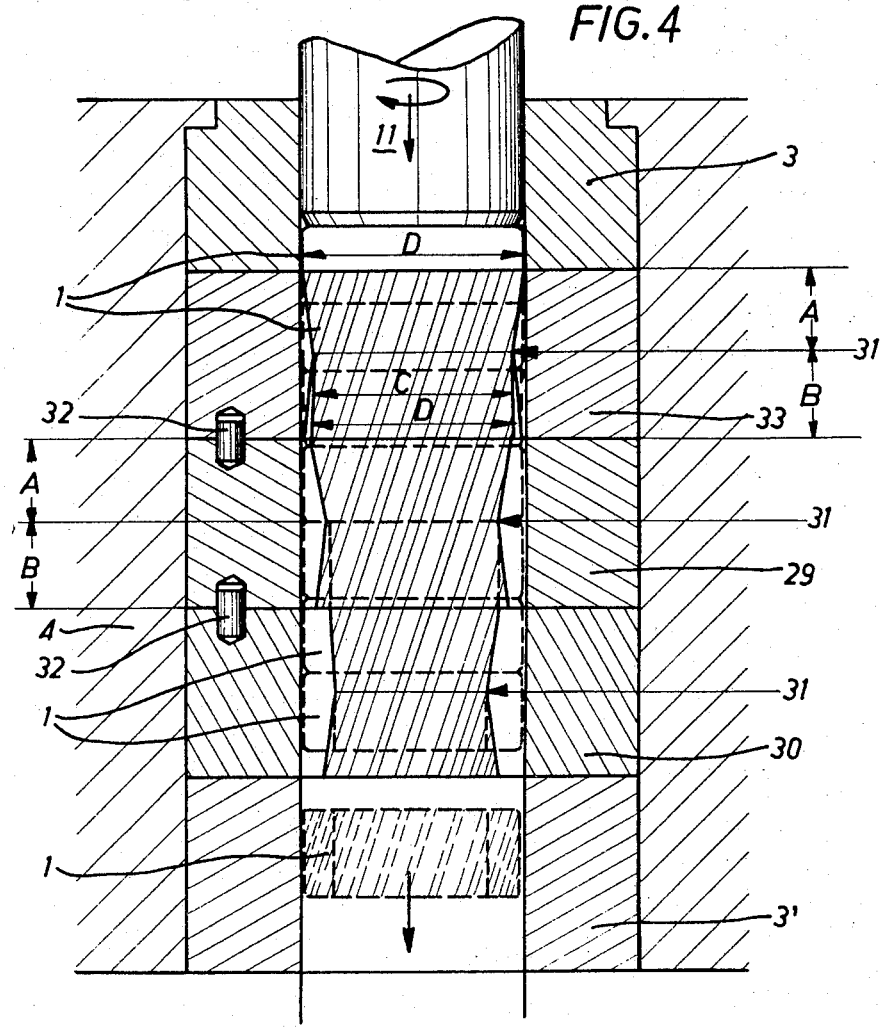

METHODS OF EXTRUDING HELICAL GEAR BLANKS

This is a division of application Ser. No. 199,987, filed Nov. 18, 1971.

The present invention relates to a method of manufacturing gear blanks, notably helical gears, under mass-production conditions, for example in the case of gears to be used in the automotive industry.

Blanks of this type, which involve the shaping of teeth to dimensions as close as possible to the final dimensions, with the subsequent finishing step consisting of shaving and/or rolling operations, are obtained as a rule by cutting the teeth on machine tools of the hob or cutter-tool type.

Various attempts have been made with a view to find a more economical process for shaping the teeth through a metal deformation. Thus, cold or hot rolling methods were developed, wherein cylindrical blanks are rolled between roller-tools or rolls forming teeth on the outer periphery of the blanks.

However, this method, in the present state of the art, is not applicable on a commercial scale for, even in the case of limited distortions, for example in the finishing passes, the rolling action constantly produced in the same direction is asymmetric and differs from one to the other side faces of a same tooth. On one side face (always the same) the blank material is shifted from the pitch circle and moved away therefrom, both upwards and downward. On the other side face, the material is forced towards the pitch circle. In the first case slight cracks may develop at the pitch circle level, and in the second case a slight bead may develop which, being subsequently crushed by the rolls, may develop scales in the surface. Therefore, the defects due to this asymmetric action of the rolls are further emphasized in the case of deeper distortions as produced during a blank rolling operation.

It is also known to manufacture spur gear blanks by extrusion, the straight shape of the teeth lending itself to this operation.

It is the essential object of this invention to provide a method for shaping helical gear blanks by cold extrusion, which is characterized in that blanks or billets are pressed in succession through a die of which the inner helical teeth are adapted to impress by extrusion corresponding external teeth on the cylindrical surface of said billets, a punch mounted for loose rotation causing the billets to be sunk or driven through the die by being pushed by the next billet interposed before producing the driving action between the billet to be extruded and the punch, according to a continuous, successive feed of said billets through the die.

With this method it is possible to obtain extremely accurate blanks corresponding exactly to the dimensions of the die, including the angle of the helical teeth thereof, with a high production rate.

Also with this method the quality of the teeth thus formed on the blank is improved considerably through a homogeneous deformation applied to each side face of the gear teeth. The equipment necessary for carrying out this method is particularly simple and a fully automatic operation may be contemplated since the blanks are fed linearly and continuously, so that the initial investments are reduced considerably.

The final machining operation consists simply in boring the central hole and truing up the faces. A finishing pass consisting in rolling the teeth, according to a well-known technique, is sufficient for obtaining the final shape of the teeth.

In this method, the billets are pressed in succession by a rotatably movable punch through a die formed with internal helical teeth so that these teeth are impressed by extrusion in the outer cylindrical surface of said billets and form the final teeth thereof.

However, this method is objectionable in that during the extrusion of the blank metal a suction effect is produced as a consequence of the creeping of the metal on the side faces of the teeth being formed, so that a slightly rounded surface is formed on the top of each tooth, this suction effect resulting from the substantial rate of metal deformation produced in the teeth formation area.

Now it is the essential object of the present invention to avoid this inconvenience by providing a method consisting, from the very beginning of the billet engagement, of impressing on the cylindrical surface thereof the top portions of the teeth and then, gradually, the complete hollows of the teeth by gradually increasing the height of the die teeth without imposing any other reduction in the cross-sectional dimension of the top portions of the teeth, the width and contour of the teeth remaining constant throughout the operation.

To this end, a die is used of which the surface of the tooth hollows or clearances is inscribed in a cylinder corresponding to the envelope cylinder of the gear to be obtained, and of which the surface areas of the teeth of the extrusion portions correspond to successive frustoconical extrusion surface areas, separated by clearances and coaxial to said cylinder.

The major base of the frustoconical inlet surface is coincident with the diameter of said envelope cylinder at the inlet orifice of the billet in the die and the minor base of the last extrusion frustoconical surface will correspond to the diameter of the root circle of the gear and will be adjacent to the outlet orifice of the die, the tooth outlines and widths remaining constant from the input end to the output end of the die, their depth varying along the taper of the envelope frustoconical surfaces of the die tooth top surfaces.

As this process involves the use of a relatively long die in order to provide through a moderate taper at the tips of the internal teeth in the extrusion cones a moderate, gradual rate of deformation in the billet teeth, as well as billet stripping clearances or areas between successive extrusion cones, this die is a composite one advantageously obtained according to the following procedure:

a. Binding or ring mounting at least two sleeve-shaped die blank elements disposed in stacked relationship and locked against relative rotation. Each one of these ring elements comprises at the lower portion of its bore a frustoconical section for releasing the billet, b. Machining by electric current erosion the constant-outline internal teeth in the thus bound and stacked die elements, c. Grinding the outer diameter of the teeth as a succession of internal stepped envelope frustoconical sections consistent with the teeth to be formed in the billet.

Thus, after the two simple machining operations (b) and (c) die tools are obtained which are ready for use in the enfilade extrusion method of this invention.

The use of a plurality of stacked die elements consisting in general of sintered metal carbides rather expensive to make in the case of relatively large dimensions led to devise an economical structure requiring but simple machining operations. On the other hand, this type of stepped die permits a tooth distortion through successive passes, thus reducing considerably the distortion efforts required during a single enfilade thrust operation according to this method.

Each die element is therefore provided with an orifice constituting the extrusion cone having an extension consisting of a clearance cone having a reverse taper, the two frustoconical sections of the element being connected through their minor bases of same diameter at the waist or minimum diameter of the die element, to be referred to hereinafter as the "neck." At this level the angle apex is corrected by a slightly rounded fillet.

The inlet diameter of the extrusion cone of a die element is slightly than the neck diameter of the preceding element in order to facilitate the billet engagement. lateral The height of each clearance portion is greater than the height or axial length of the billet passage through this portion in order to avoid a simultaneous extrusion engagement with two die elements.

The invention will now be described more in detail with reference to the accompanying drawing illustrating diagrammatically by way of example a typical form of embodiment of the invention. In the drawing:

FIG. 2 is a fragmentary view showing a tooth outline obtaining in a billet during the extrusion engagement thereof in a conventional-type die;

FIG. 3 illustrates the tooth outline obtaining during the extrusion of a billet in a die according to the improved method of this invention, and FIG. 4 is a fragmentary vertical axial section showing the die and the billet extrusion procedure according to the method of this invention.

Figure 1:
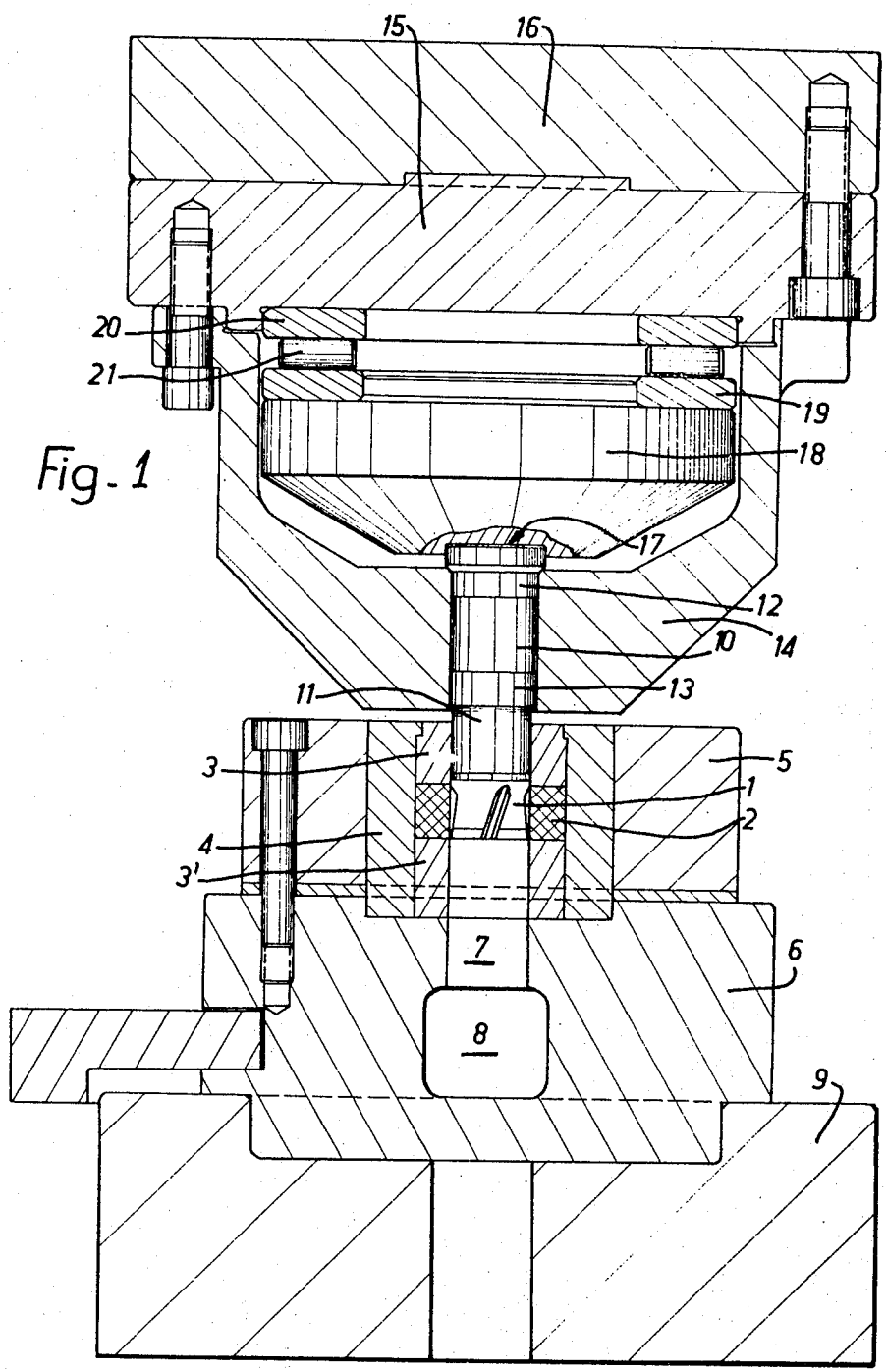
FIG. 1 is a vertical axial section showing the press equipment contemplated for the extrusion operation.

Referring first to FIG. 1, a billet or blank 1 is shown during its extrusion through a die 2 formed with internal helical teeth, these teeth forming from the engagement face downwards a gradually projecting portion corresponding to the conventional throttling cone of the extrusion techniques, followed by a short portion having a constant maximum tooth depth followed in turn by a portion in which the tooth depth decreases gradually, this last-named portion corresponding to the workpiece clearance cone. The die 2 consisting preferably of tungsten carbide is mounted in a manner known per se between two bearing rings 3, 3' and a socket 4 in a binding 5 secured by screws to a base plate 6. Upon completion of the extrusion operation the workpieces are dropped through a discharge hole 7 into a cavity 8 communicating with a workpiece receiving trough (not shown). The base plate 6 is centered to the die holder 9 of the press.

The billets 1 are pushed through the die 2 by a punch 10 having a lower end portion 11 of a diameter slightly inferior to that of said billet 1 and to that of the bores of rings 3 and 3', in order to exert a uniform pressure throughout the cross-sectional area of said billet 1. The punch 10 is guided vertically by a pair of cylindrical surfaces 12 and 13 in a guide strap 14 rigid with a base plate 15 centered to the upper plate 16 of the press.

The extrusion pressure is transmitted from the plate press 16 to the punch 10 via the top bearing surface 17 of this punch which is centered to a bearing member 18 rotatably engaging a roller thrust bearing 19 having its fixed race 20 centered in said base plate 15.

Thus, as said punch 10 is being driven axially downwards during the extrusion operation, the billet 1 can rotate freely with the punch 10 and member 18, due to the interposition of the radial rollers 21 of thrust bearing 19. The helical teeth of die 2 penetrates into the billet 1 according to the pitch angle of these teeth. Thus, external helical teeth having the same pitch angle are formed on the cylindrical outer surface of billet 1, due to the absence of any torque in the billet during the extrusion operation.

The punch 10 is shown in its lowermost position in FIG. 1. According to the direct enfilade extrusion process contemplated, when a billet has been extruded to a certain extent the punch is raised and the next billet is introduced, the subsequent downward stroke of the punch pushing the new billet while completing the extrusion of the preceding one and beginning the extrusion of the next billet. The billets are fed and discharged through automatic means of conventional type (not shown). These automatic means are operated in synchronism with the rate of sinking of punch 10.

As a typical example of a practical application of the method of this invention, the blank of a planet pinion for a change-speed gear mechanism of automobile vehicle, which pinion is a helical gear comprising 22 teeth having a module of 1,25, a helix angle of 16° and a final outer diameter of 31.60 mm, is made from a billet having a diameter of 32 mm and consisting of grade 35 CD4 steel (French Standard AFNOR) under a pressure of 30 tons, the reduction in the cross-sectional area being about 15 %.

The necessary checking of the helix pitch obtained in the billets can be performed very easily during the extrusion operation by measuring the rotation of the punch holder for a given sinking or axial movement thereof. By properly applying this angular measurement with the press operation control means it is thus possible to exert a permanent control of the degree of precision of the extrusion operation, notably by automatically stopping this operation in case of damage in the roller thrust bearing 19.

The extrusion method according to this invention is also applicable to billets wherein the central bore of the finished pinion has already been formed. With this procedure the subsequent re-centering of this bore in relation to the pinion teeth is avoided while warranting a satisfactory and reliable concentricity of the bore and teeth.

In this case, the punch is provided with a centering cylindrical extension which receives the billets, the lower end of this cylindrical extension being somewhat bevelled to facilitate the engagement thereof into the billet bores, the length of the cylindrical portion being substantially twice the height of a billet in order to permit the simultaneous centering of two billets during the manufacturing process.

The plastic deformations inherent to the extrusion operation are attended in most cases by a shrinking of the blank bore on the centering extension of the punch. However, the partial engagement of the next, overlying billet into the die and a proper lubrication of said bore and extension are sufficient for releasing the punch without resorting to any specific ejection means.

The fact that the preliminary bore of this type of blank can advantageously to be obtained by using tubular stock simplifies considerably the pinion finishing operations while ensuring a convenient centering of the blank for the final rolling operation and also for truing the lateral faces of the pinion.

The same dies can be used indifferently for both blank types.

In FIG. 2 there is shown diagrammatically the tooth outline during the extrusion of a billet 1 under the pressure of the teeth 22 of a conventional-type die 2.

The teeth 22 are impressed in the initial contour 23 of the billet and cause the billet metal to be driven along their faces as shown by the arrows 24, so that the teeth edges 25 are rounded as a consequence of the suction effect thus produced.

In FIG. 3, the outline 26 is the contact line obtained between the billet (having initially the contour 23) and the teeth of die 2; according to this invention, the outer faces of the teeth 27 are impressed immediately as the billet engages the die 2. The dash lines 28 designate the outlines of the successive steps of the tooth formation in the billet 1, according to the corresponding contour in the die.

The deformations produced in the billet determine a slight elongation thereof.

In FIG. 4 there is illustrated in diagrammatic sectional view a die comprising three die elements 33, 29 and 30 stacked concentrically between clamping rings 3 and 3' in a binding 4 and mutually locked against rotation by studs 32. A plurality of billets 1 shown in dash lines are pushed through the die by the end 11 of a punch 10 adapted to move both axially and rotatably.

Each die element has its extrusion orifice divided into two frustoconical tapered and opposed portions assembled by their minor bases in their neck zone 31, the extrusion frustoconical portion having a height A, an inlet diameter D and an outlet diameter C at the level of said neck 31.

The inlet diameter D of the extrusion cone of a die element is slightly greater than the neck diameter C of the preceding die element, in order to facilitate the billet engagement.

Similarly, to avoid the simultaneous engagement for extrusion purpose of a same billet on two die elements, which would obviously produce a jamming effect, the billet height will be slightly inferior to the height B of the release or clearance cone, with due consideration for its elongation during its passage through said cone.

The taper of the tooth faces in the case of involute teeth, in the extrusion cones, will advantageously range from 10° to 20°.

The helical pinion blanks thus obtained need simply a finishing rolling operation before being used in the mechanisms contemplated.

Although this invention has been described with reference to a specific form of embodiment it will readily occur to those conversant with the art that various modifications and variations may be brought thereto without departing from the spirit and scope of the invention as set forth in the appended claims.

What is claimed as new is:

1. A method of manufacturing a composite die which is capable of producing helical gear blanks by cold extrusion of successive billets through the die comprising a. binding or ring mounting of at least two sleeve-shaped die blank elements disposed in stacked relationship and locked against relative rotation, each element comprising at the lower portion of its bore a frustoconical section for releasing the billet,
   b. machining by electric current erosion the constant-outline internal teeth in the thus bound and stacked die elements, and
   c. grinding the outer diameter of the teeth as a succession of internal stepped envelope frustoconical sections consistent with the teeth to be formed in the billet.

2. A method according to claim 1, wherein each die element comprises a frustoconical extrusion surface connected through a so-called neck portion to a reverse cone provided for releasing the billet, the input diameter of the extrusion cone being slightly greater than the neck diameter of the preceding element.

3. A method according to claim 2, wherein the height of the billet release cone is slightly greater than the height of said billet during its passage through said portion.

4. A method according to claim 2, wherein the taper of the developed helical generatrix of the tooth tips in the frustoconical extrusion surface ranges from 10° to 20°.

* * * * *